US 6,546,097 B1

(12) United States Patent
Peltz

(10) Patent No.: US 6,546,097 B1
(45) Date of Patent: Apr. 8, 2003

(54) AUTOMATIC CALL DISTRIBUTION SYSTEM WITH SIGNAL GENERATOR AND METHOD

(75) Inventor: Marshall Peltz, Bolingbrook, IL (US)

(73) Assignee: Rockwell Electronic Commerce Corp., Wood Dale, IL (US)

( * ) Notice: Subject to any disclaimer, the term of this patent is extended or adjusted under 35 U.S.C. 154(b) by 0 days.

(21) Appl. No.: 09/311,614

(22) Filed: May 13, 1999

(51) Int. Cl.[7] .............................................. H04M 3/00
(52) U.S. Cl. ............................ 379/265.07; 379/88.22; 379/88.01
(58) Field of Search ..................... 379/265.7, 266.8, 379/72, 80, 87, 88.2, 88.22, 88.01

(56) References Cited

U.S. PATENT DOCUMENTS

| | | | |
|---|---|---|---|
| 4,809,272 A | 2/1989 | Torgrim et al. | 370/110.3 |
| 5,159,626 A | * 10/1992 | Baum | 379/67 |
| 5,724,420 A | 3/1998 | Torgrim | 379/372 |
| 6,226,360 B1 | * 5/2001 | Goldberg et al. | 379/69 |
| 6,269,151 B1 | * 7/2001 | Hanson | 379/69 |

* cited by examiner

Primary Examiner—Ahmad F. Matar
Assistant Examiner—Rasha S Al-Aubaidi
(74) Attorney, Agent, or Firm—Welsh & Katz, Ltd.

(57) ABSTRACT

An automatic call distribution system and method for using same including an automatic call distributor, an answer detector and an introductory signal generator which generates introductory signals to be sent towards a called party while the answer detector employed by the automatic call distribution center is monitoring for the presence of the called party. When a call that is dialed to the called party by the automatic call distribution system is answered by an external telephonic unit of the called party, the automatic call distribution system couples an answer detector to the call. The answer detector of the automatic call distribution system monitors the call for the presence of the called party while concomitantly sending a generated and coupled introductory signal towards the called party to be heard by the called party. Preferably, the generated introductory signal simulates background noise. When the called party makes a response, the answer detector then detects the presence of the called party for the purpose of routing the call.

21 Claims, 1 Drawing Sheet

AUTOMATIC CALL DISTRIBUTION SYSTEM WITH SIGNAL GENERATOR AND METHOD

BACKGROUND OF THE INVENTION

1. Field of the Invention

This invention relates generally to telecommunications systems and, more particularly, to automatic call distribution systems.

2. Description of the Prior Art

It is well known in the art of telecommunications systems to employ automatic call distributors (ACDs). Automatic call distribution systems often contain a multiport switch that is controlled by a central processing unit (CPU) and a main memory operating together. Automatic call distributors may be used for selectively interconnecting and routing telephone calls that are placed from external telephonic units via an external switched telephone network, such as an external public switched telephone network (PSTN), and received by the automatic call distribution system.

Automatic call distribution systems are also used to automatically outdial calls from the automatic call distribution system to called parties of the external PSTN. Such calls may be outdialed predictively, with the outdialing automatic call distribution system employing an outdialing algorithm in order to efficiently control the flow of the outdialed calls from the automatic call distributor to the algorithmically selected external telephonic units.

Such outdialing automatic call distribution systems often employ answer detectors to more efficiently and judiciously control the connections of internal telephonic units with external telephonic units. These answer detectors determine first whether an outdialed call has been connected at an external telephonic unit, and subsequently, upon detecting a call connection, determine whether a detected voice is either recorded voice or nonrecorded (i.e., live). If the call is answered by a recorded voice from an answering machine, the system will terminate the call. However, if the call is answered by a live voice (i.e., the "called party"), the call is then routed by the automatic call distribution system to an agent at an internal telephonic unit of the automatic call distribution system. Automatic call distribution systems employing answer detectors that differentiate between recorded answers and live voice answers upon the connection of a call at an external telephonic unit and efficiently route the call to agents are known in the art.

Automatic call distribution systems employing outdialing features are designed to efficiently dial external telephonic units, determine that called parties are on the line, and connect the successfully answered calls to agents. One of the goals of such a system is to efficiently connect the maximum number of called parties with agents. However, prior art automatic call distribution systems fail both to maximize the detection of called parties that are on the line and to maximize the number of called parties that are connected to agents because the called parties that pick up their telephone in response to an incoming call placed by the automatic call distribution system may not actually respond to the call with the live voice required for an answer detector to detect the presence of the called party. The prior art fails to consider the fact that some called parties, after picking up the phone but before talking into the phone, may listen to the phone for any signals being sent from the calling party (here, the automatic call distribution system). In prior art systems, in the phase of the call when the answer detector in the automatic call distribution system is attached to the outdialed call and the call is being monitored for a response, a quiet signal can be heard by the called party. The called party, hearing a dead line, may: silently wait for the calling party to respond (such response will not occur in automatic call distribution systems that are designed to monitor the called party for a voice response before determining whether to connect the call to an agent); or, may hang up without speaking, which will terminate the call before the answer detector can detect that the called party is actually on the line. As a result, an agent is denied the opportunity to speak to a called party even though the called party had actually answered the phone. This result diminishes the efficacy of the automatic call distribution system.

There is a need in the art for an automatic call distribution system that increases the probability that a called party will stay on the line in response to a call placed by the automatic call distribution system. There is also a need in the art to increase the probability that the system will eventually be able to detect the presence of the called party and route the call to an agent if the called party answers a call placed by the automatic call distribution system and does not immediately respond with a live voice.

SUMMARY OF THE INVENTION

These and other needs in the art are met by providing an automatic call distribution system that includes an introductory signal that is generated by the system and sent towards the called party while an answer detector is monitoring the called party for a response. If the called party hears this generated introductory signal instead of a quiet signal, the called party will be more likely to believe that the call was of human origin and that the calling party did not abandon the call. Therefore, the called party is more likely to stay on the line in response to the call (instead of terminating the call) and to make an oral response, thus allowing the answer detector to detect the presence of the called party and allowing the automatic call distributor to route the call to an agent. The more similar that this introductory signal is to common background noise, the more effective the introductory signal will be in causing the called party to remain on the line and to make an oral response. This invention improves the efficiency of the automatic call distribution system by increasing the numbers of called parties answering their telephones that are both detected by the answer detector and routed to agents at an internal telephonic unit.

In accordance with an illustrated embodiment of the present invention, an automatic call distribution system is provided which comprises an automatic call distributor, an answer detector coupled with the automatic call distributor, and an introductory signal generator coupled with the automatic call distributor which is configured to generate introductory signals to the called party that are concomitant with the operation of the answer detector. The system may also comprise a host computer system, which controls the operation of the automatic call distributor. The automatic call distributor preferably comprises a central processing unit and memory. Preferably, the automatic call distribution system also comprises a dialing system, which is coupled to the automatic call distributor. The introductory signal generator may be a concomitant introductory signal generator. The introductory signal generator may be integrated into the answer detector. Preferably, the introductory signal generator is designed to generate introductory signals that simulate background noise.

In accordance with another form of the present invention, a method for increasing the probability that a caller will stay on the line in response to a call placed by an automatic distribution system is provided. The method comprises the steps of: waiting for a call connection, coupling an answer detector system to the call connection, coupling a generated introductory signal to the call connection, and monitoring for the presence of the called party while concomitantly sending the generated introductory signal towards the called party. The introductory signal may be generated and coupled to the call before it is sent towards the called party. The detector system may be coupled after there is a call connection. The detector system may monitor the called party for an aural response. Preferably, the introductory signal that is sent towards the called party comprises a simulation of common background noise.

These and other features and advantages of the present invention will become apparent from the following detailed description, the accompanying drawing and the appended claims.

DETAILED DESCRIPTION OF THE PREFERRED EMBODIMENT

Figure 1:
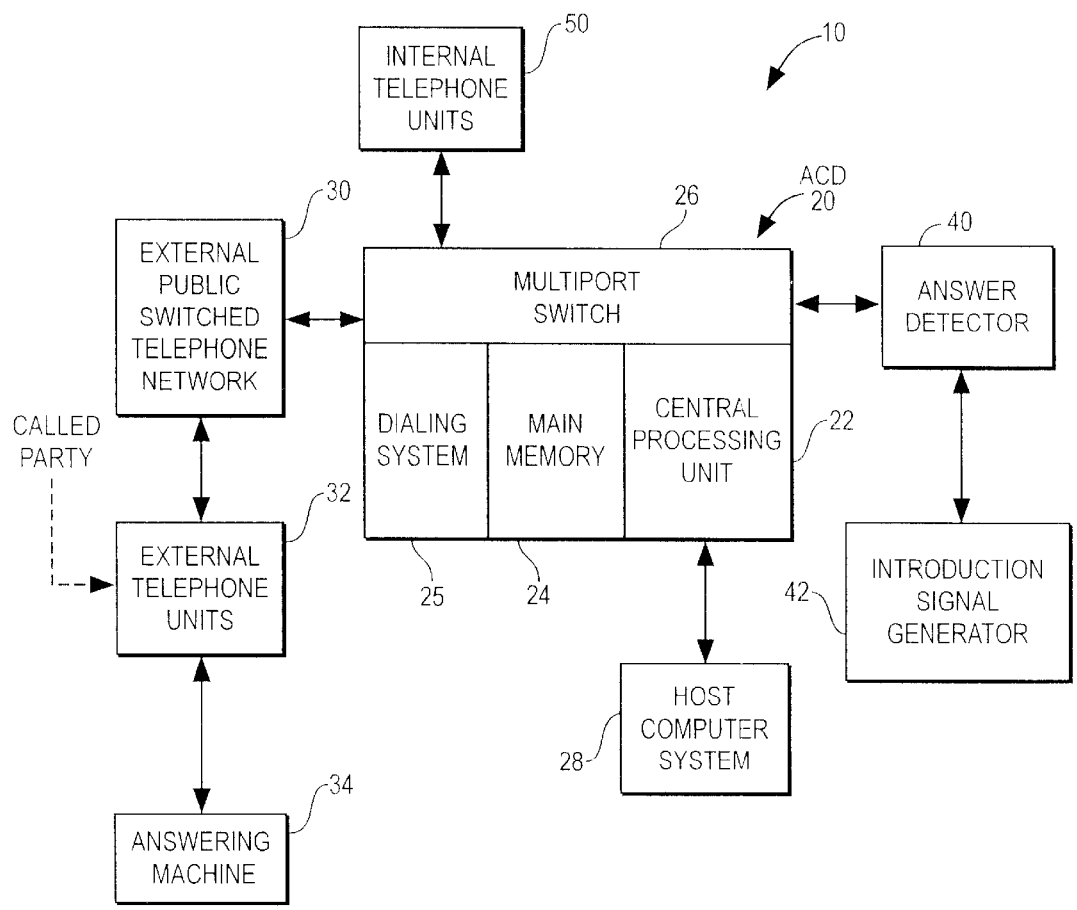
FIG. 1 is a system block diagram of an automatic call distribution system in accordance with the present invention.

FIG. 1 is a system block diagram of an automatic call distribution system 10 in accordance with the present invention. The automatic call distribution system 10 is employed to outdial calls from the automatic call distributor 20 to external telephonic units 32 via an external switched telephone network 30 to be answered by a called party or an answering machine 34, which may be coupled to the external telephonic unit 32. (As used herein a "called party" is defined to be the living person owning or controlling the external telephonic unit and answering machine.) The automatic call distribution system 10 may also employ an automatic call distributor 20 for selectively receiving calls that are incoming from external telephonic units 32 via an external switched telephone network 30, such as a public switched telephone network, and routing the calls to internal telephonic units 50, where the calls are answered by agents.

When the automatic call distribution system 10 is employed for outdialing, a host computer system 28 may employ an outdialing algorithm, which controls the flow of outdialed calls to the external telephonic units 32. The host computer system 28 transmits outdialing information to the central processing unit (CPU) 22 of the automatic call distributor 20 for outdialing calls according to a prescribed algorithm. The dialing may be performed by a dialing system 25 that is coupled to the automatic call distributor 20. The central processing unit 22 of the automatic call distributor 20, in conjunction with the distributor's main memory 24, controls the multiport switch 26 for selective outdialing of calls via the external switched telephone network 30 to the external telephonic unit 32 of a called party. The methods for placing the outdialed calls to the external telephonic units 32 may be altered in ways apparent to those skilled in,the art. An answer detector 40 may be coupled to the call via the multiport switch 26 of the automatic call distributor 20 for monitoring the external telephonic unit 32 of a called party for a call connection indication. The automatic call distribution system 10 waits for a call connection. If, within a prescribed number of "rings", no call connection has been detected, the automatic call distributor 20 may terminate the call.

If a call has been connected, an answer detector 40 is coupled to the call and employed to monitor the external telephonic unit 32 for the presence of the called party, preferably for a response, such as an aural response. The answer detector 40 preferably will monitor the call for voice characteristic energy for the purpose of determining whether or not the called party is present and on the phone. If the answer detector 40 used for monitoring for the presence of the called party was coupled to the call for the purpose of detecting the initial call connection, or any other purpose, it may remain coupled to the call for the monitoring phase. The answer detector 40 may be configured to wait a specified time for a response before terminating the call.

During the phase of the call in which the call is being monitored for a response, an introductory signal generator 42 generates an introductory signal that is coupled to the call through an outbound signal path. The introductory signal generated by the introductory signal generator 42 may be coupled to the call via the answer detector 40, directly through the automatic call distributor 20, or in any manner that may be apparent to those in the art. The introductory signal generator 42 may be integrated into the answer detector 40. The introductory signal generator 42 is configured to generate signals which are coupled to the call and transmitted via the automatic call distributor 20 to the external telephonic unit 32 through the outbound signal path while the answer detector 40 is monitoring the connected call for a response on the inbound signal path. The introductory signal generator 42 preferably will transmit signals concomitant with the monitoring of the answer detector 40. The introductory signal generation and transmission may, but need not, be concurrent. It is sufficient for this introductory signal to be generated, coupled, and transmitted to the external telephonic unit 32 in any manner or sequence readily understood by those in the art so long as a called party, or, a device employed by the called party, would be able to perceive a generated introductory signal, instead of merely the prior art quiet signal, during the phase of the call in which the answer detector 40 is monitoring the call for a response.

The introductory signals that are generated by the introductory signal generator 42 would preferably be, but need not be, a simulation of room background noise that is commonly heard by a party to a conversation through the other party's telephone. The method of signal generation employed by the introductory signal generator 42 could be accomplished by a pseudo-random noise generator, but it need not be. The introductory signal may also be generated through the reproduction or other use of any repeating or continuous recorded signal on any recording media, such as a tape loop or other media. It may be generated through the use of one or more processors. The specific signals generated by the introductory signal generator 42 need not be identical for each outdialed call. The more closely the introductory signal simulates common background noise, the more likely the signal is to succeed in its ability to keep the called party on the line of his or her external telephonic unit 32. Introductory signals may be sent other than those simulating common background noise, but the introductory signal generator 40 will preferably be configured to generate an introductory signal which simulates background noise.

If the answer detector 40, operating concomitantly with the sending of the generated introductory signal to the external telephonic unit 32, detects that an answering machine 34 or some other undesirable apparatus for answering call signals has in fact answered the call, the call will be terminated, and will not be routed to an internal telephonic unit 50 for connection to an agent. If a called party has answered the external telephonic unit 32, the answer detector 40 coupled to the call will be monitoring the call and detect the presence of the called party, preferably from an aural response, such as an oral response, and preferably through the detection of voice characteristic energy.

A called party, upon picking up the telephone handset, may listen for signals that are sent from a calling party before giving a response to the call. While this called party is on the line, the introductory signal is being sent towards the called party. In the prior art systems, the called party, upon hearing a quiet signal, may suspect or believe that the call has been abandoned, or that the line is "dead", or that the call was of non-human origin, such as a telemarketing call. The called party, under these prior art systems, may terminate the call without making an oral response. Under the present invention, the called party, upon hearing the generated introductory signal, will be more likely to believe that the call is still connected and that the call is of human origin, and thus not terminate the call. If the called party in this latter belief makes a response that indicates to the answer detector 40 that a called party is present, such as an oral response, then the answer detector 40 will be able to detect the presence of a called party at the external telephonic unit 32, and thus route the call through the automatic call distributor 20 to an internal telephonic unit 50, for connection with an agent. Thus, the answer detector 40 used in this automatic call distribution system 10 will be more likely to detect the presence of called parties that, before giving a response, listen to signals placed from calling parties.

The structure, control and arrangement of the conventional components have, for the most part, been illustrated in the drawings by readily understandable block representations. The drawings show only those specific details that are pertinent to the present invention in order not to obscure the disclosure with structural details which will be readily apparent to those skilled in the art having the benefit of the description herein.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. In an automatic call distribution system comprising an answer detector, a method of increasing a probability that a called party will stay on a line in response to a call placed by the automatic call distribution system, the method comprising the steps of:
   (a) waiting for a call connection:
   (b) coupling the answer detector to the call connection;
   (c) provoking the called party to make an oral response by coupling a generated introductory signal of simulated room background noise that is commonly heard by a party to a conversation through another party's telephone to the call connection; and
   (d) monitoring for the presence of the called party while concomitantly sending the generated introductory signal from the automatic call distributor towards the called party.

2. The method of claim 1 where the generated introductory signal is configured to simulate background noise.

3. The method of claim 2 where the generated introductory signal is transmitted over a voice path.

4. The method of claim 2 where the generated introductory signal is generated by a pseudo-random noise generator.

5. The method of claim 2 where the generated introductory signal is generated by reproduction of a recorded signal.

6. The method of claim 2 comprising the additional step of dialing the called party.

7. The method of claim 2 where the answer detector is configured to monitor the called party for voice characteristic energy.

8. An automatic call distribution system which is configured to send a generated introductory signal to a called party concomitant with an operation of an answer detector system, the method comprising:
   (a) an automatic call distributor;
   (b) an answer detector coupled to the automatic call distributor; and
   (c) an introductory signal generator coupled to the automatic call distributor which is configured to provoke the called party into making an oral response by generating an introductory signal of simulated room background noise that is commonly heard by a party to a conversation through another party's telephone to be sent towards the called party concomitant with the operation of the answer detection system.

9. The automatic call distribution system of claim 8 where the introductory signal generator is configured to generate an introductory signal that simulates background noise.

10. The automatic call distribution system of claim 9 further comprising a dialer.

11. The automatic call distribution system of claim 9 further comprising a host computer system which is coupled to the automatic call distributor and which controls a flow of outdialed calls.

12. The automatic call distribution system of claim 9 where the introductory signal generator comprises a pseudo-random noise generator.

13. The automatic call distribution system of claim 9 where the introductory signal generator comprises a recorded signal reproducer.

14. The automatic call distribution system of claim 9 where the answer detector comprises a detector of voice characteristic energy of the called party.

15. An automatic call distribution system which is configured to send generated introductory signals towards a called party concomitant with a means for answer detecting, the automatic call distribution system comprising:
   (a) means for waiting for a call connection;
   (b) means for answer detecting;
   (c) means for coupling the means for answer detecting to the call connection;
   (d) means for generating an introductory signal to provoke the called party into making an oral response by simulating room background noise that is commonly heard by a party to a conversation through another party's telephone;
   (e) means for coupling the generated introductory signal to the call connection; and
   (f) means for monitoring for the presence of the called party while concomitantly sending the generated introductory signal towards the called party.

16. The automatic call distribution system of claim 15, further comprising means for dialing.

17. The automatic call distribution system of claim 15, where the means for generating an introductory signal comprises means for generating an introductory signal which simulates background noise.

18. The automatic call distribution system of claim 17, where the means for generating an introductory signal comprises means for pseudo-random noise generation.

19. The automatic call distribution system of claim 17, where the means for generating an introductory signal comprises means for reproducing a recorded signal.

20. The automatic call distribution system of claim 17, where the means for monitoring the presence of the called party while concomitantly sending the generated introductory signal towards the called party comprises means for transmitting the generated introductory signal over a voice path.

21. The automatic call distribution system of claim 17, where the means for answer detecting comprises means for detecting voice characteristic energy of the called party.

\* \* \* \* \*